United States Patent
Zhang et al.

(10) Patent No.: US 10,153,839 B2
(45) Date of Patent: Dec. 11, 2018

(54) REGISTRATION METHOD, DEVICE AND SYSTEM

(71) Applicant: Huawei Technologies Co., Ltd., Shenzhen (CN)

(72) Inventors: Xiaofeng Zhang, Shenzhen (CN); Guikai Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/581,809

(22) Filed: Apr. 28, 2017

(65) Prior Publication Data

US 2017/0237489 A1 Aug. 17, 2017

Related U.S. Application Data

(63) Continuation of application No. PCT/CN2014/089702, filed on Oct. 28, 2014.

(51) Int. Cl.
*H04B 10/25* (2013.01)
*H04L 27/20* (2006.01)
(Continued)

(52) U.S. Cl.
CPC ..... *H04B 10/2503* (2013.01); *H04B 10/0795* (2013.01); *H04B 10/272* (2013.01);
(Continued)

(58) Field of Classification Search
CPC ........... H04B 10/1149; H04B 10/2503; H04B 10/0795; H04B 10/272; H04L 12/413;
(Continued)

(56) References Cited

U.S. PATENT DOCUMENTS

2005/0286465 A1 12/2005 Zhuang
2010/0178051 A1 7/2010 Mizutani et al.
(Continued)

FOREIGN PATENT DOCUMENTS

CN  102263726 A  11/2011
CN  102893628 A  1/2013
(Continued)

OTHER PUBLICATIONS

Machine Translation and Abstract of Chinese Publication No. CN102893628, Jan. 23, 2013, 31 pages.
(Continued)

*Primary Examiner* — Ted Wang
(74) *Attorney, Agent, or Firm* — Conley Rose, P.C.

(57) ABSTRACT

A terminal device registration method and a device, where the method includes sending upstream registration window information to a terminal device, where the upstream registration window information indicates a starting position of an upstream registration window to the terminal device, receiving an upstream access signal sent by the terminal device from the starting position of the upstream registration window, where the upstream access signal includes a correlation sequence symbol and at least one orthogonal frequency division multiplexing (OFDM) symbol following the correlation sequence symbol, the correlation sequence symbol is constituted by a first sequence that meets a preset condition, and the at least one OFDM symbol modulates access information by means of differential phase modulation in a frequency domain, and performing upstream ranging according to the starting position of the upstream registration window and the correlation sequence symbol.

14 Claims, 9 Drawing Sheets

(51) Int. Cl.
*H04L 27/26* (2006.01)
*H04B 10/079* (2013.01)
*H04L 5/00* (2006.01)
*H04B 10/272* (2013.01)
*H04J 3/06* (2006.01)

(52) U.S. Cl.
CPC .......... *H04J 3/0682* (2013.01); *H04L 5/0007* (2013.01); *H04L 27/2071* (2013.01); *H04L 27/2607* (2013.01); *H04L 27/2663* (2013.01); *H04L 27/2666* (2013.01); *H04L 27/2671* (2013.01); *H04L 27/2675* (2013.01); *H04L 27/2692* (2013.01)

(58) Field of Classification Search
CPC ............... H04L 5/0007; H04L 27/2071; H04L 27/2671; H04L 27/2675; H04L 27/2607; H04L 27/2663; H04L 27/2666; H04L 27/2692; G02B 6/272; G02B 6/274; G02B 6/2786; H04J 3/0682
See application file for complete search history.

(56) References Cited

U.S. PATENT DOCUMENTS

| | | | |
|---|---|---|---|
| 2013/0216228 A1 | 8/2013 | Nazarathy et al. | |
| 2014/0199074 A1 | 7/2014 | Cho et al. | |
| 2014/0255029 A1* | 9/2014 | Varanese | H04L 27/2626 398/66 |

FOREIGN PATENT DOCUMENTS

| | | |
|---|---|---|
| CN | 103378918 A | 10/2013 |
| CN | 103686474 A | 3/2014 |

OTHER PUBLICATIONS

Machine Translation and Abstract of Chinese Publication No. CN103686474, Mar. 26, 2014, 10 pages.
"Overview of 3GPP Release 9 V0.3.4," Sep. 2014, 125 pages.
Foreign Communication From A Counterpart Application, PCT Application No. PCT/CN2014/089702, English Translation of International Search Report dated Feb. 3, 2015, 2 pages.
Foreign Communication From A Counterpart Application, PCT Application No. PCT/CN2014/089702, English Translation of Written Opinion dated Feb. 3, 2015, 6 pages.
Lee, D., et al., "Performance Analysis of Ranging Process in IEEE 802.16e OFDMA Systems," XP031338299, IEEE International Conference on Wireless and Mobile Computing, Networking and Communications (WiMob), Oct. 8, 2007, 10 pages.
Foreign Communication From A Counterpart Application, European Application No. 14904753.2, Extended European Search Report dated Oct. 6, 2017, 9 pages.
Machine Translation and Abstract of Chinese Publication No. CN102263726, Nov. 30, 2011, 14 pages.
Machine Translation and Abstract of Chinese Publication No. CN103378918, Oct. 30, 2013, 29 pages.
Xin, J., et al., "Range Finding and Compensation Mechanism in EPON/GPON Systems," Modern Science and Technology of Telecommunications, Mar. 31, 2010, 6 pages.
Foreign Communication From A Counterpart Application, Chinese Application No. 201480009166.8, Chinese Office Action dated May 4, 2018, 5 pages.

* cited by examiner

REGISTRATION METHOD, DEVICE AND SYSTEM

CROSS-REFERENCE TO RELATED APPLICATIONS

This application is a continuation of International Patent Application No. PCT/CN2014/089702 filed on Oct. 28, 2014. The disclosure of which is hereby incorporated by reference in its entirety.

TECHNICAL FIELD

The present disclosure relates to the field of communications technologies, and in particular, to a registration method, a device, and a system.

BACKGROUND

A passive optical network (PON) technology is a point-to-multipoint fiber optic transmission and access technology, and uses a broadcast manner in the downstream and a Time Division Multiple Access (TDMA) manner in the upstream. A PON may flexibly form topological structures, such as tree, star, and bus. With no need of a node device at an optical branch point, only a simple optical splitter needs to be mounted.

FIG. 1 is a schematic structural diagram of a tree topology used by a PON. The topology includes an optical line terminal (OLT) 101 on an office side, an optical network unit (ONU) or optical network terminal (ONT) 103 on a user side, and an optical distribution network (ODN) 102. The meaning of "passive" is that the ODN does not include any active electronic component or electronic power supply, but includes only a passive component, such as an optical splitter.

In a PON system, a direction of transmission from an ONU to an OLT is an upstream direction, in which a TDMA manner is used, that is, upstream data sending is in a burst mode. Different ONUs occupy different upstream timeslots, and multiple ONUs share an upstream link in a time division multiplexing manner. There is a collision avoidance guard interval between each upstream timeslot and a next upstream timeslot. To ensure that an upstream data collision does not occur, a ranging technology needs to be used in upstream sending in order to measure a round trip time of a data signal from being sent in the downstream to being received in the upstream by an OLT, and perform delay compensation accordingly. Therefore, it is ensured that after converging into a common optical fiber, upstream signals of each ONU are inserted into designated timeslots, and neither a collision nor an excessive gap exists between the upstream signals. The ONU further needs to register on the OLT before upstream ranging is performed, and registration and ranging are separate. A specific registration method is as follows. The OLT periodically allocates an upstream registration window, and the ONU sends a registration message in the upstream registration window. The OLT parses the registration information sent by the ONU, and sends acknowledgment information to the ONU if the information is correctly parsed, or the OLT does not perform processing if the information is not correctly parsed, without receiving acknowledgment information after a timeout, the ONU randomly backs off for a period of time, and then sends the registration information again in an upstream registration window for registration until registration succeeds. A specific ranging method is follows. An OLT opens a ranging window for a registered ONU, and performs ranging using a timestamp method. A disadvantage of this technology is that registration and ranging are separate, and at least two upstream windows greater than a propagation delay are needed.

With development of technologies, an orthogonal frequency division multiplexing (OFDM) technology is currently applied to the PON system. However, the foregoing registration and ranging methods cannot be applied to an OFDM-PON system. In an OFDM-PON, a registration message is used only for phase synchronization based on a sampling point, and cannot complete demodulation. Therefore, a special modulation form needs to be set for demodulation of information carried in an OFDM symbol. Ranging in the PON is Media Access Control (MAC) layer ranging based on a timestamp, and a delay between a MAC layer and a physical layer (PHY) is required to be relatively fixed in order to ensure that a ranging result at the MAC layer does not cause a collision at the physical layer. OFDM is in a unit of a symbol, and a delay between a MAC layer and a PHY layer is not fixed. Therefore, in the OFDM-PON system, it is infeasible to perform registration and ranging in a manner used in the PON.

SUMMARY

Embodiments of the present disclosure provide a registration method, a device, and a system such that upstream registration and upstream ranging can be implemented in an OFDM-PON system.

To resolve the foregoing technical problem, the embodiments of the present disclosure disclose the following technical solutions.

According to a first aspect, an embodiment of the present disclosure provides an upstream registration method, including sending, by a central office device, upstream registration window information to a terminal device, where the upstream registration window information indicates a starting position of an upstream registration window the terminal device sends an upstream light, receiving, by the central office device, an upstream access signal sent by the terminal device, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, performing, by the central office device, upstream ranging according to the correlation sequence symbol and a starting position of an upstream registration window indicated by the central office device using the upstream registration window information in order to obtain an upstream ranging result, and determining, by the central office device, the access information according to the at least one OFDM symbol, and sending, by the central office device, the upstream ranging result and a response message of the access information to the terminal device.

With reference to the first aspect, in a first possible implementation manner of the first aspect, there is one OFDM symbol, and the OFDM symbol and the correlation sequence symbol are modulated with the access information by means of differential phase modulation in a frequency domain, and determining, by the central office device, the access information according to the at least one OFDM symbol includes demodulating, by the central office device, the correlation sequence symbol and the OFDM symbol in order to obtain the access information.

With reference to the first aspect, in a second possible implementation manner of the first aspect, there are at least two OFDM symbols, and two adjacent OFDM symbols are modulated with the access information by means of differential phase modulation in a frequency domain, and determining, by the central office device, the access information according to the at least one OFDM symbol includes demodulating, by the central office device, the at least two OFDM symbols in order to obtain the access information.

With reference to the first aspect, the first possible implementation manner of the first aspect, and/or the second possible implementation manner of the first aspect, in a third possible implementation manner of the first aspect, performing, by the central office device, upstream ranging according to the correlation sequence symbol and a starting position of an upstream registration window indicated by the central office device using the upstream registration window information includes calculating, by the central office device according to the correlation sequence symbol, a starting position at which the central office device receives the upstream access signal, and calculating, by the central office device, a distance between the starting position at which the central office device receives the upstream access signal and the starting position of the upstream registration window indicated by the central office device using the upstream registration window information, and setting the distance as the upstream ranging result.

With reference to the first aspect, the first possible implementation manner of the first aspect, the second possible implementation manner of the first aspect, and/or the third possible implementation manner of the first aspect, in a fourth possible implementation manner of the first aspect, the correlation sequence symbol carries a cyclic prefix and/or a cyclic suffix.

With reference to the first aspect, the first possible implementation manner of the first aspect, the second possible implementation manner of the first aspect, the third possible implementation manner of the first aspect, and/or the fourth possible implementation manner of the first aspect, in a fifth possible implementation manner of the first aspect, each OFDM symbol in the at least one OFDM symbol carries a cyclic prefix and/or a cyclic suffix, or the at least one OFDM symbol carries a cyclic prefix and/or a cyclic suffix.

According to a second aspect, an embodiment of the present disclosure provides a terminal device registration method, including receiving, by a terminal device, upstream registration window information sent by a central office device, where the upstream registration window information indicates a starting position of an upstream registration window, sending, by the terminal device, an upstream access signal to the central office device from the starting position of the upstream registration window, where the upstream access signal includes a correlation sequence symbol and at least one OFDM symbol following the correlation sequence symbol, where the correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, and receiving, by the terminal device, an upstream ranging result and response information of the access information that are sent by the central office device, where the upstream ranging result is obtained by performing upstream ranging by the central office device according to the correlation sequence symbol and the starting position of the upstream registration window indicated by the central office device using the upstream registration window information, and the access information is determined by the central office device according to the at least one OFDM symbol.

With reference to the second aspect, in a first possible implementation manner of the second aspect, the correlation sequence symbol carries a cyclic prefix and/or a cyclic suffix.

With reference to the second aspect, and/or the first possible implementation manner of the second aspect, in a second possible implementation manner of the second aspect, each OFDM symbol in the at least one OFDM symbol carries a cyclic prefix and/or a cyclic suffix, or the at least one OFDM symbol carries a cyclic prefix and/or a cyclic suffix.

According to a third aspect, an embodiment of the present disclosure provides a central office device, including a sending unit configured to send upstream registration window information to a terminal device, where the upstream registration window information indicates a starting position of an upstream registration window to the terminal device, a receiving unit configured to receive an upstream access signal sent by the terminal device from the starting position of the upstream registration window, where the upstream access signal includes a correlation sequence symbol and at least one OFDM symbol following the correlation sequence symbol, where the correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, and a processing unit configured to perform upstream ranging according to the correlation sequence symbol received by the receiving unit and the starting position of the upstream registration window indicated by the sending unit using the upstream registration window information in order to obtain an upstream ranging result, and determine the access information according to the at least one OFDM symbol received by the receiving unit, where the sending unit is further configured to send the upstream ranging result obtained by the processing unit and response message of the access information to the terminal device.

With reference to the third aspect, in a first possible implementation manner of the third aspect, there is one OFDM symbol, and the OFDM symbol and the correlation sequence symbol are modulated with the access information by means of differential phase modulation in a frequency domain, and the processing unit is further configured to demodulate the correlation sequence symbol and the OFDM symbol in order to obtain the access information.

With reference to the third aspect, in a second possible implementation manner of the third aspect, there are at least two OFDM symbols, and two adjacent OFDM symbols are modulated with the access information by means of differential phase modulation in a frequency domain, and the processing unit is further configured to demodulate the at least two OFDM symbols in order to obtain the access information.

With reference to the third aspect, the first possible implementation manner of the third aspect, and/or the second possible implementation manner of the third aspect, in a third possible implementation manner of the third aspect, the processing unit is further configured to calculate, according to the correlation sequence symbol, a starting position at which the receiving unit receives the upstream access signal, and calculate a distance between the starting position at which the receiving unit receives the upstream access signal and the starting position of the upstream registration window indicated by the sending unit using the upstream registration window information, and set the distance as the upstream ranging result.

With reference to the third aspect, the first possible implementation manner of the third aspect, the second possible implementation manner of the third aspect, and/or the third possible implementation manner of the third aspect, in a fourth possible implementation manner of the third aspect, the correlation sequence symbol carries a cyclic prefix and/or a cyclic suffix.

With reference to the third aspect, the first possible implementation manner of the third aspect, the second possible implementation manner of the third aspect, the third possible implementation manner of the third aspect, and/or the fourth possible implementation manner of the third aspect, in a fifth possible implementation manner of the third aspect, each OFDM symbol in the at least one OFDM symbol carries a cyclic prefix and/or a cyclic suffix, or the at least one OFDM symbol carries a cyclic prefix and/or a cyclic suffix.

According to a fourth aspect, an embodiment of the present disclosure provides a terminal device, including a receiving unit configured to receive upstream registration window information sent by a central office device, where the upstream registration window information indicates a starting position of an upstream registration window, and a sending unit configured to send an upstream access signal to the central office device from the starting position of the upstream registration window indicated using the upstream registration window information received by the receiving unit, where the upstream access signal includes a correlation sequence symbol and at least one OFDM symbol following the correlation sequence symbol, the correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, where the receiving unit is further configured to receive an upstream ranging result and response message of the access information that are sent by the central office device, where the upstream ranging result is obtained by performing upstream ranging by the central office device according to the correlation sequence symbol and the starting position of the upstream registration window indicated by the central office device using the upstream registration window information, and the access information is determined by the central office device according to the at least one OFDM symbol.

With reference to the fourth aspect, in a first possible implementation manner of the fourth aspect, the correlation sequence symbol carries a cyclic prefix and/or a cyclic suffix.

With reference to the fourth aspect, and/or the first possible implementation manner of the fourth aspect, in a second possible implementation manner of the fourth aspect, each OFDM symbol in the at least one OFDM symbol carries a cyclic prefix and/or a cyclic suffix, or the at least one OFDM symbol carries a cyclic prefix and/or a cyclic suffix.

According to a fifth aspect, an embodiment of the present disclosure provides an optical network system, including a central office device and a terminal device, where the central office device includes any central office device described above, and the terminal device includes any terminal device described above.

Embodiments of the present disclosure provide a registration method, including sending, by a central office device, upstream registration window information to a terminal device, where the upstream registration window information indicates a starting position of an upstream registration window to the terminal device, receiving an upstream access signal sent by the terminal device from the starting position of the upstream registration window, where the upstream access signal includes a correlation sequence symbol and at least one OFDM symbol following the correlation sequence symbol, the correlation sequence symbol is constituted by a first sequence that meets a preset condition, the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, performing upstream ranging according to the correlation sequence symbol and the starting position of the upstream registration window indicated by the central office device using the upstream registration window information in order to obtain an upstream ranging result, and determining the access information according to the at least one OFDM symbol, and sending the upstream ranging result and response message of the access information to the terminal device. Therefore, the central office device can perform upstream ranging according to the starting position of the upstream registration window and the correlation sequence symbol in order to obtain an upstream ranging result, and determine the access information according to the at least one OFDM symbol, thereby implementing upstream registration and upstream ranging.

BRIEF DESCRIPTION OF DRAWINGS

To describe the technical solutions in the embodiments of the present disclosure more clearly, the following briefly describes the accompanying drawings required for describing the embodiments. Persons of ordinary skill in the art may still derive other drawings from these accompanying drawings without creative efforts.

DESCRIPTION OF EMBODIMENTS

Figure 1:
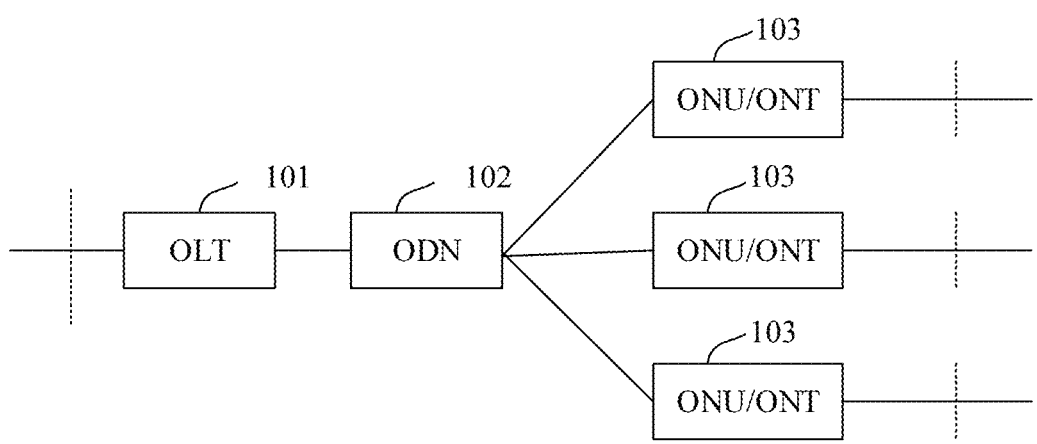
FIG. 1 is a schematic structural diagram of a tree topology used by a PON.

OFDM is a type of multi-carrier modulation (MCM). A main idea of the OFDM is dividing a channel into several orthogonal subchannels, converting a high-rate data signal into parallel low-rate sub data streams, and modulating the parallel low-rate sub data streams to the subchannels for transmission. Orthogonal signals may be separated at a receive end using a correlation technology in order to reduce mutual interference between the subchannels. A signal bandwidth of each subchannel is less than a coherence bandwidth of the channel. Therefore, each subchannel may be regarded as flat fading, and interference between symbols can be canceled. In addition, because a bandwidth of each subchannel is only a small part of an original channel bandwidth, channel equalization becomes relatively easy.

In an OFDM propagation process, a high-rate information data stream is allocated, by means of serial-to-parallel conversion in order to several relatively low-rate subchannels for transmission. A symbol period in each subchannel is relatively increased such that intersymbol interference (ISI) caused to a system by time dispersivity generated from a multipath delay spread of a radio channel can be reduced. In addition, with the guard interval introduced, if the guard interval is greater than a maximum multipath delay spread, the ISI caused by multipath can be canceled to a maximum extent. Interchannel interference caused by multipath may further be avoided.

In a past frequency division multiplexing (FDM) system, an entire bandwidth is divided into N sub-bands, and the sub-bands do not overlap each other. To avoid mutual interference between the sub-bands, a guard bandwidth is generally added between the bands, but this may reduce spectrum utilization. To overcome this disadvantage, N overlapping sub-bands are used in OFDM, and the sub-bands are orthogonal. Therefore, a signal may be received at a receive end without a need to separate a spectrum.

A guard interval is added at a transmit end of an OFDM system, mainly for a purpose of canceling ISI caused by multipath. A method is filling a cyclic prefix into a guard interval of an OFDM symbol in order to ensure that a quantity of waveform cycles included in a delay copy of the OFDM symbol in a Fast Fourier Transform (FFT) is an integer. In this way, a signal whose delay is less than the guard interval does not generate ISI in a modulation process.

Because of a relatively strong anti-ISI capability and high spectrum efficiency, an OFDM technology has been applied to optical communications since 2001, and a considerable quantity of researches show that this technology in the optical communications is feasible.

Embodiment 1

This embodiment of the present disclosure provides a terminal device registration method such that upstream registration and upstream ranging can be implemented in an OFDM-PON system.

To make persons skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 2:
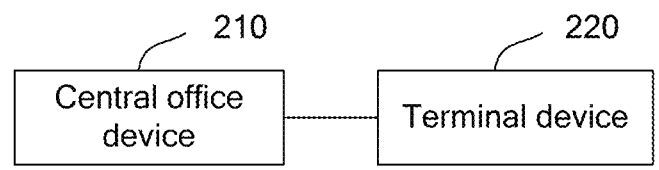
FIG. 2 is a diagram of an example of a network structure to which a terminal device registration method is applied according to the present disclosure.

The following embodiments shown in FIG. 3A to FIG. 6 may be applied to an OFDM-PON system in a network architecture shown in FIG. 2. Referring to FIG. 2, the OFDM-PON system includes a central office device 210 and a terminal device 220 connected to the central office device 210 using an optical fiber. The central office device 210 refers to a device on a central-office side of the OFDM-PON system, for example, an OLT. The terminal device 220 refers to a device on a user side, for example, an ONU, an ONT, or the like.

Figure 3A:
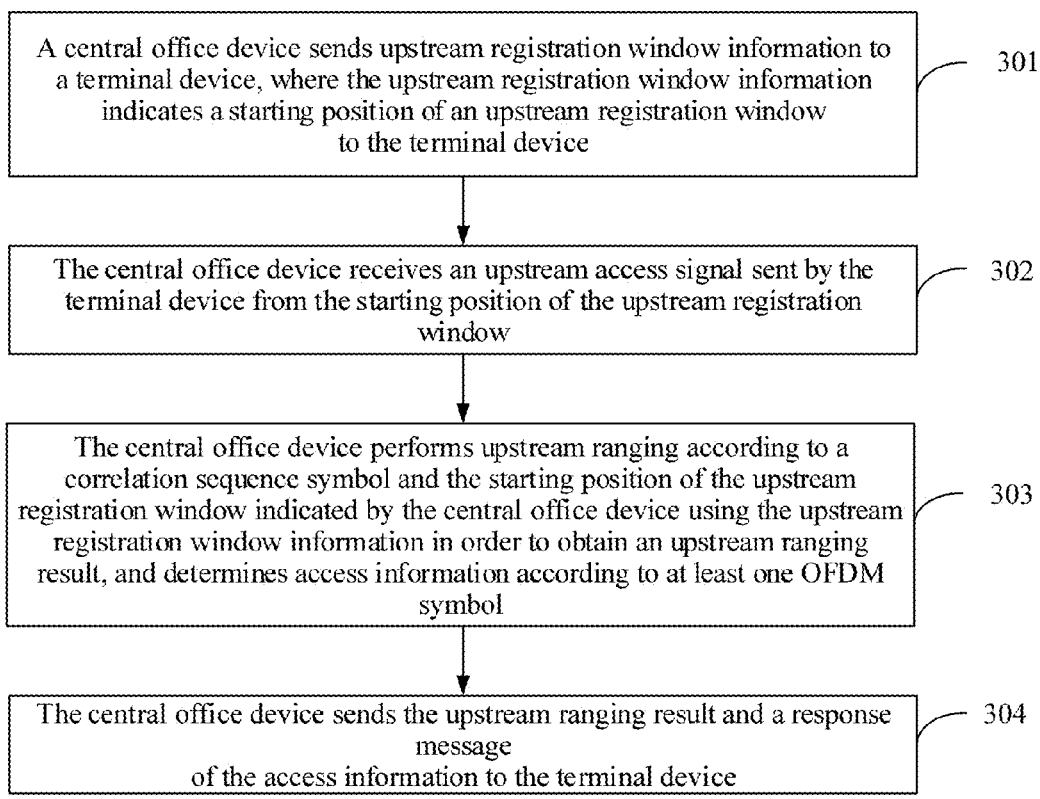
FIG. 3A is a schematic flowchart diagram of an embodiment of a terminal device registration method according to the present disclosure.

Referring to FIG. 3A, FIG. 3A is a schematic flowchart of an embodiment of a terminal device registration method according to the present disclosure. The method includes the following steps.

Step 301: A central office device sends upstream registration window information to a terminal device, where the upstream registration window information indicates a starting position of an upstream registration window to the terminal device.

Step 302: The central office device receives an upstream access signal sent by the terminal device from the starting position of the upstream registration window, where the upstream access signal includes a correlation sequence symbol and at least one OFDM symbol. The correlation sequence symbol includes a first sequence that meets a preset condition, and the preset condition includes a peak-to-average ratio of a second sequence obtained after a correlation operation of the first sequence with the first sequence itself is greater than a preset first value. The at least one OFDM symbol modulates access information by means of differential phase modulation in a frequency domain, and the access information may include a terminal device identifier, such as an ONU identifier (ONU-ID) or a logic ONUID (LOID), or the access information may include a serial number (SN) of the terminal device.

A peak-to-average ratio of a sequence refers to a ratio of a maximum value to an average value of the sequence. A specific value of the preset first value may be set in actual application, and is not limited in this embodiment of the present disclosure.

The correlation operation may be:

$$\hat{R}_{xy}(-m) = \begin{cases} \sum_{n=0}^{N-m-1} x_n + m y_n^* & m \geq 0 \\ \hat{R}_{yx(-m)}^* & m < 0 \end{cases},$$

where both x and y are first sequences that meet the preset condition, N is a length of the first sequence, and the second sequence obtained after the correlation operation is:

$$c(m)=R_{xy}(m-N), m=1,\ldots,2N-1.$$

For example, the first sequence may be a sequence of the length N=128, and includes: 1, −1, −1, −1, −1, −1, −1, −1, −1, −1, −1, −1, −1, −1, −1, −1, 1, 1, 1, −1, 1, −1, −1, 1, 1, 1, −1, 1, 1, −1, −1, 1, 1, −1, −1, −1, −1, 1, 1, 1, −1, −1, 1, 1, 1, −1, 1, 1, −1, −1, −1, 1, 1, −1, 1, −1, 1, −1, −1, 1, −1, −1, −1, −1, 1, 1, −1, −1, 1, 1, −1, −1, −1, −1, −1, 1, −1, 1, 1, −1, −1, 1, 1, −1, −1, −1, −1, 1, 1, −1, 1, 1, −1, 1, 1, 1, 1, 1, 1, 1, 1, −1, −1, 1, −1, 1, −1, −1, −1, −1, −1, −1, −1, 1, −1, −1, −1, 1, 1, −1, 1, 1, 1, −1, 1, 1, 1, −1.

Figure 3B:
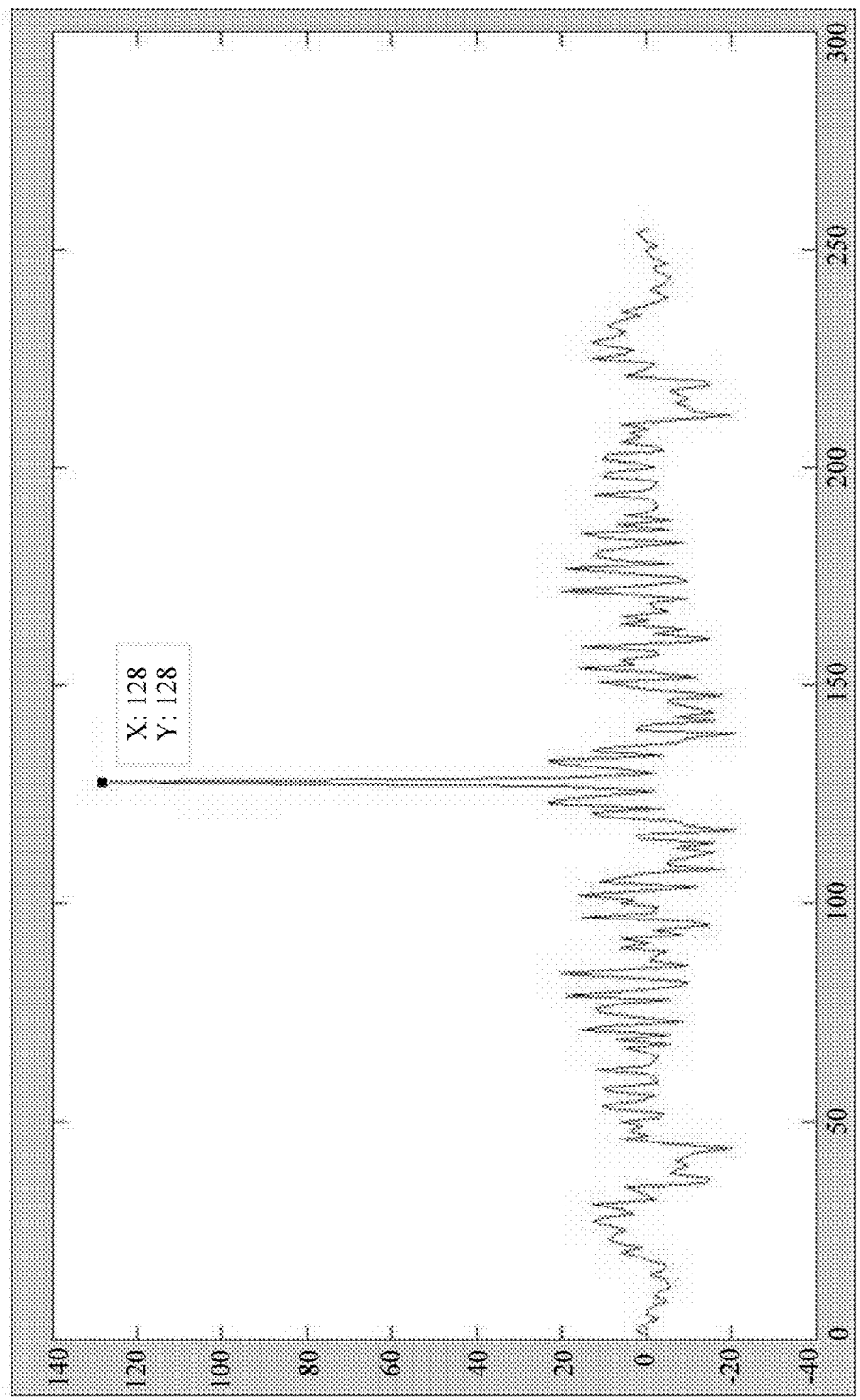
FIG. 3B is a diagram of an example of a second sequence according to the present disclosure.

The second sequence obtained after the foregoing correlation operation of the first sequence with the first sequence itself is shown in FIG. 3B. The second sequence has a total of 255 points, a maximum value of the second sequence is a point at which the first sequence overlaps itself in the correlation operation, that is, a value of a point 128 shown in the FIG. 3B, and an average value of the second sequence may be obtained by averaging values of all the points of the sequence. A ratio of the value of the point 128 to the average value of the second sequence should be greater than the preset first value if the first sequence of 128 points in the foregoing example meets the preset condition.

The maximum value of the second sequence is the point at which the first sequence overlaps itself in the correlation operation, and the second sequence has an obvious maximum value. For example, the value of the point 128 in FIG. 3B is the maximum value of the sequence, and the point corresponds to the point 128 in the first sequence. Therefore, when the central office device receives the upstream access signal, a position of the correlation sequence symbol in the upstream access signal may be obtained by searching for the maximum value in the subsequent step 303 in order to obtain a starting position of the upstream access signal.

It should be noted that the correlation operation may further be performed in another manner. Performing a correlation operation on a sequence is based on other approaches, and this embodiment of the present disclosure provides merely an implementation manner. Another correlation operation in other approaches may also be applied to the present disclosure, and details are not described herein.

Figure 3C:
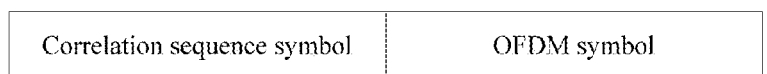
FIG. 3C, FIG. 3D, FIG. 3E, and FIG. 3F are diagrams of examples of an upstream access signal according to the present disclosure.

In a specific implementation manner, there may be one OFDM symbol, and the OFDM symbol and the correlation sequence symbol may modulate the access information by means of differential phase modulation in a frequency domain. In this case, a structure of the upstream access signal is shown in FIG. 3C. In this case, a length of the correlation sequence symbol is preferably set to one symbol in order to implement differential phase modulation with the OFDM symbol, or may be greater than or equal to two symbols.

Figure 3D:
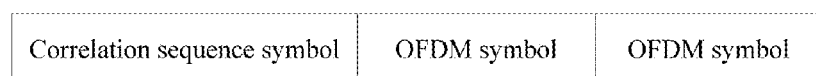

In another specific implementation manner, there may be two or more OFDM symbols. Two adjacent OFDM symbols may be used to modulate the access information by means of differential phase modulation in a frequency domain. In this case, assuming that there are two OFDM symbols, a structure of the upstream access signal is shown in FIG. 3D. In this case, a length of the correlation sequence symbol is not limited.

In the upstream access signal shown in FIG. 3C and FIG. 3D, neither the correlation sequence symbol nor the OFDM symbol carries a cyclic prefix (designated as CP) or a cyclic suffix (designated as CS). In actual application, the correlation sequence symbol may carry a cyclic prefix and/or a cyclic suffix.

Figure 3E:
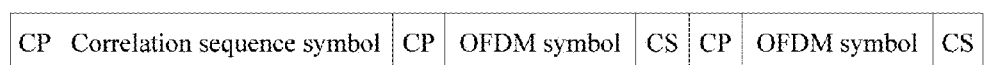

Each OFDM symbol in the at least one OFDM symbol carries a cyclic prefix and/or a cyclic suffix. Assuming that there are two OFDM symbols, the correlation sequence symbol caries a cyclic prefix, and each OFDM symbol carries a cyclic prefix and a cyclic suffix, a structure of the upstream access signal is shown in FIG. 3E.

Figure 3F:
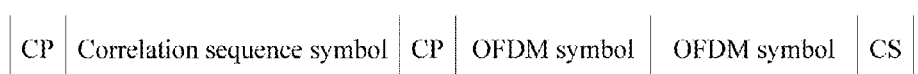

Alternatively, the at least one OFDM symbol carries a cyclic prefix and/or a cyclic suffix. Assuming that there are two OFDM symbols, the correlation sequence symbol caries a cyclic prefix, and the two OFDM symbol carries a cyclic prefix and a cyclic suffix, a structure of the upstream access signal is shown in FIG. 3F.

Figure 3G:
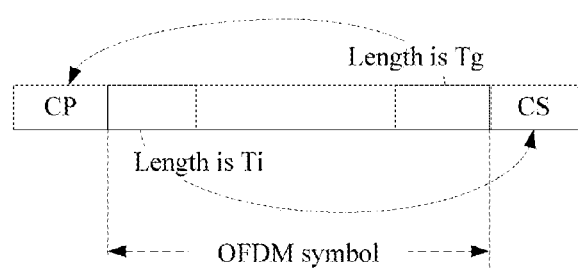
FIG. 3G is a diagram of a structural relationship between an OFDM symbol and a cyclic prefix or a cyclic suffix of the OFDM symbol according to the present disclosure.

In an OFDM system, a guard interval may be inserted before each symbol, such as an OFDM symbol in order to cancel ISI to a maximum extent. A cyclic prefix is a signal transmitted in the guard interval. For the cyclic prefix carried in the foregoing symbol, for example, the correlation sequence symbol or the OFDM symbol, assuming that the cyclic prefix occupies a length Tg of the guard interval, the cyclic prefix may be the same as a part of a length Tg at the tail of the symbol. For a similar reason, a guard interval for transmitting a cyclic suffix may be inserted after the symbol. For the cyclic suffix carried in the foregoing symbol, for example, the correlation sequence symbol or the OFDM, assuming that the cyclic suffix occupies a length Ti of the guard interval, the cyclic suffix may be the same as a part of a length Ti at the head of the symbol. As shown in FIG. 3G, an example of a relationship between an OFDM symbol and a cyclic prefix and a cyclic suffix is given in a manner of a figure.

In a possible implementation manner, a differential phase modulation method used in this embodiment of the present disclosure may include differential quadrature phase shift keying (DQPSK) modulation. The following Table 1 shows a relationship between a current input bit, a quadrant phase change, most significant bits (MSBs) of a previously transmitted symbol, and MSBs of a currently transmitted symbol in current DQPSK modulation. In this embodiment of the present disclosure, when differential phase modulation is being performed, modulation of the access information may be implemented according to the relationship shown in Table 1. Further, in DQPSK, digit information is represented using a relative phase change between a former element and a latter element. Therefore, in this embodiment of the present disclosure, the access information may be divided every two bits, and each two bits are used as current input bits in Table 1. In addition, an initial phase difference is pre-determined, and a quadrant phase change corresponding to each two current input bits may be obtained according to Table 1. Quadrant phase shift is performed, in a frequency domain according to the quadrant phase change, on two symbols used for differential phase modulation in order to implement differential phase modulation.

TABLE 1

| Current input bits | Quadrant phase change | MSBs of a previously transmitted symbol | MSBs of a currently transmitted symbol |
|---|---|---|---|
| 00 | 0 | 11 | 11 |
| 00 | 0 | 01 | 01 |
| 00 | 0 | 00 | 00 |
| 00 | 0 | 10 | 10 |
| 01 | 90 | 11 | 01 |
| 01 | 90 | 01 | 00 |
| 01 | 90 | 00 | 10 |
| 01 | 90 | 10 | 11 |
| 11 | 180 | 11 | 00 |
| 11 | 180 | 01 | 10 |
| 11 | 180 | 00 | 11 |
| 11 | 180 | 10 | 01 |
| 10 | 270 | 11 | 10 |
| 10 | 270 | 01 | 11 |
| 10 | 270 | 00 | 01 |
| 10 | 270 | 10 | 00 |

Step 303: The central office device performs upstream ranging according to the correlation sequence symbol and the starting position of the upstream registration window indicated by the central office device using the upstream registration window information in order to obtain an upstream ranging result, and determines the access information according to the at least one OFDM symbol.

In this step, the central office device may first calculate, according to the correlation sequence symbol, a starting position at which the central office device receives the upstream access signal, then calculate a distance between the starting position at which the central office device receives the upstream access signal and the starting position of the upstream registration window indicated by the central office device using the upstream registration window information, and set the distance as the upstream ranging result in order to implement upstream ranging.

Figure 3H:
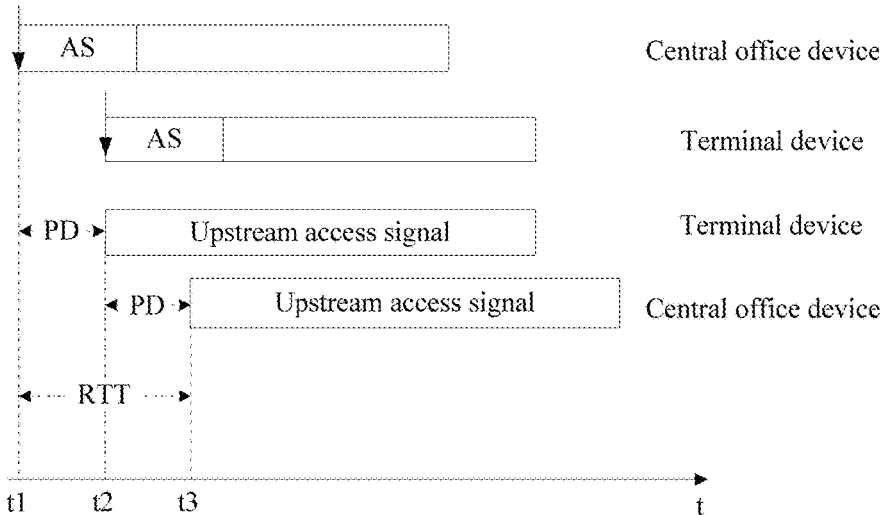
FIG. 3H is a diagram of an example of an upstream ranging method and principle according to the present disclosure.

Further, for example, it is assumed that the central office device indicates the upstream registration window information to the terminal device using a correlation sequence AS in step 301. As shown in FIG. 3H, the central office device sends the correlation sequence AS to the terminal device at a first moment t1. The first moment t1 at which the correlation sequence AS starts to be transmitted is the starting position of the upstream registration window indicated by the central office device using the upstream registration window information. After a specific delay, the terminal device starts to receive the correlation sequence AS at a second moment t2, and the terminal device starts to send an upstream access signal to the central office device at the second moment t2. After a specific delay, the central office device starts to receive the upstream access signal at a third moment t3. The third moment t3 is the starting position at which the central office device receives the upstream access signal, and the starting position may be determined by the central office device according to the correlation sequence symbol in the upstream access signal. A time length between the second moment t2 and the first moment t1 and a time length between the third moment t3 and the second moment t2 are separately propagation delays (PD) between the central office device and the terminal device. A time length between third moment t3 and the first moment t1 is a round trip time (RTT) of a data signal from being sent in the downstream to being received in the upstream by the central office device, that is, an upstream ranging result expected in upstream ranging in this embodiment of the present disclosure.

A principle for determining the starting position of the upstream access signal is already described in step 302. As shown in FIG. 3B, the central office device may determine the position of the correlation sequence symbol by searching for the maximum value of the sequence obtained after the correlation operation of the correlation sequence symbol with itself in order to determine the starting position of the upstream access signal.

In this step, the central office device may obtain the access information by demodulating the correlation sequence symbol and the OFDM symbol when there is one OFDM symbol, or the central office device may obtain the access information by demodulating the at least two OFDM symbols when there are at least two OFDM symbols.

Step 304: The central office device sends the upstream ranging result and a response message of the access information to the terminal device.

Further, the central office device sends a registration success message to the terminal device after the terminal device passes registration confirmation, or sends a registration failure message to the terminal device when registration of the terminal device fails.

After receiving the foregoing upstream ranging result and the access information, when determining, according to the access information, that the upstream ranging result is an upstream ranging result of the terminal device, the terminal device may adjust a data sending time according to the upstream ranging result, and data exchange at a data link layer or a network layer may be performed between the central office device and the terminal device.

In this embodiment, a central office device receives an upstream access signal sent by a terminal device from a starting position of an upstream registration window, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain. Therefore, the central office device can perform upstream ranging according to the correlation sequence symbol and the starting position of the upstream registration window indicated by the central office device using upstream registration window information in order to obtain an upstream ranging result, and determine the access information according to the at least one OFDM symbol, thereby implementing upstream registration and upstream ranging.

In addition, compared with a ranging method in other approaches, in this embodiment, the correlation sequence symbol is carried in the upstream access signal such that the central office device can find an initial position of the upstream access signal, and implement upstream ranging. In addition, this embodiment is executed at a PHY layer, and a relatively non-fixed delay between a MAC layer and a PHY layer in an OFDM PON system does not affect the upstream ranging result, nor cause a collision at the physical layer. Compared with a registration method in other approaches, in this embodiment, an OFDM symbol modulates the access information by means of differential phase modulation in a frequency domain in order to ensure that the central office device can correctly demodulate the access information.

Embodiment 2

Figure 4:
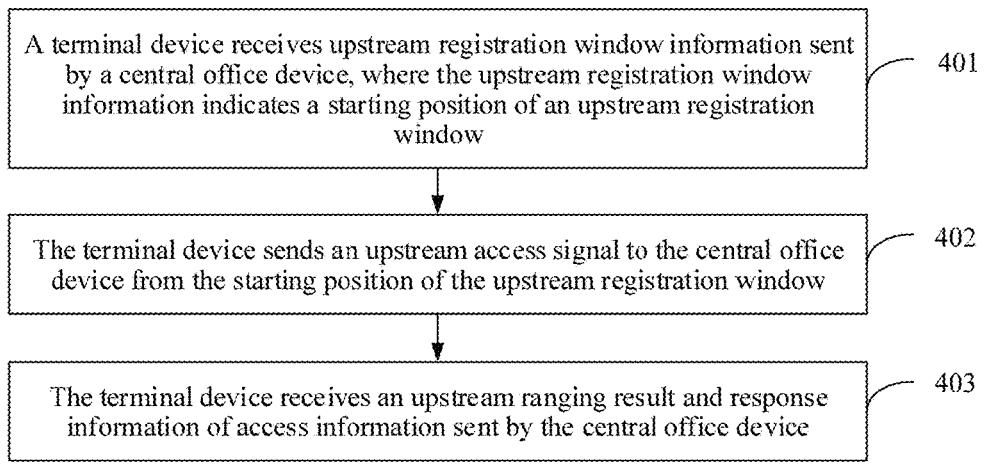
FIG. 4 is a schematic flowchart diagram of another embodiment of a terminal device registration method according to the present disclosure.

Referring to FIG. 4, FIG. 4 is a flowchart of another embodiment of a terminal device registration method according to the present disclosure. In this embodiment, description is made from a perspective of a terminal device, and the method includes the following steps.

Step 401: A terminal device receives upstream registration window information sent by a central office device, where the upstream registration window information indicates a starting position of an upstream registration window.

Step 402: The terminal device sends an upstream access signal to the central office device from the starting position of the upstream registration window, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain. For explanations of meanings of the foregoing correlation sequence symbol and the peak-to-average ratio, refer to Embodiment 1. Definition of the content in Embodiment 1 is also applicable to Embodiment 2, and details are not described herein.

Step 403: The terminal device receives an upstream ranging result and a response message of the access information sent by the central office device, where the upstream ranging result is obtained by performing upstream ranging by the central office device according to the correlation sequence symbol and the starting position of the upstream registration window indicated by the central office device using the upstream registration window information, and the access information is determined by the central office device according to the at least one OFDM symbol.

In this embodiment, a terminal device receives upstream registration window information sent by a central office device, and sends an upstream access signal to the central office device from a starting position of an upstream registration window. Therefore, the central office device can perform upstream ranging and determining of access information according to the upstream access signal, and complete upstream ranging and registration together with the terminal device.

Embodiment 3

Figure 5:
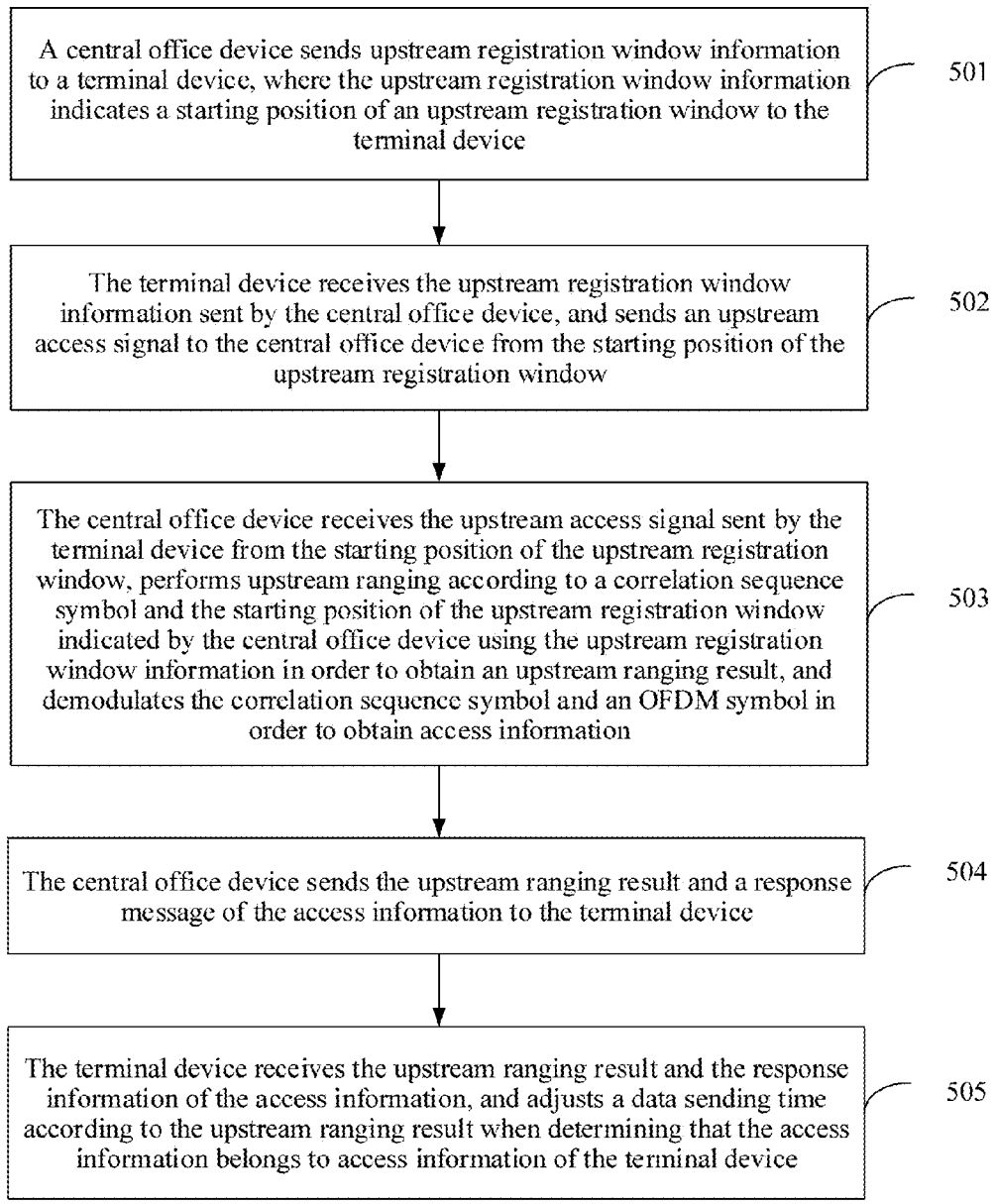
FIG. 5 is a schematic flowchart diagram of another embodiment of a terminal device registration method according to the present disclosure.

Referring to FIG. 5, FIG. 5 is a flowchart of another embodiment of a terminal device registration method according to the present disclosure. This embodiment describes a process in which a central office device and a terminal device implement upstream registration and ranging by means of interworking, and the method includes the following steps.

Step 501: A central office device sends upstream registration window information to a terminal device, where the upstream registration window information indicates a starting position of an upstream registration window to the terminal device.

Step 502: The terminal device receives the upstream registration window information sent by the central office device, and sends an upstream access signal to the central office device from the starting position of the upstream registration window.

The upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the OFDM symbol and the correlation sequence symbol are modulated with access information by means of differential phase modulation in a frequency domain. A length of the correlation sequence symbol is preferably a length of one symbol.

Before sending the upstream access signal to the central office device in this step, the terminal device needs to first generate the upstream access signal. Further, generating the upstream access signal may include determining the correlation sequence symbol, determining the OFDM symbol following the correlation sequence symbol, where the OFDM symbol and the correlation sequence symbol are modulated with the access information by means of differential phase modulation in a frequency domain, and generating the upstream access signal according to the determined correlation sequence symbol and the determined OFDM symbol.

Generally, an actual data amount of the access information is not large, and therefore the access information may be modulated using one OFDM symbol and the correlation sequence symbol by means of differential phase modulation in a frequency domain. However, in actual application, if the data amount of the access information is relatively large, or the terminal device needs to transmit other information using the upstream access signal, there may further be one or more OFDM symbols following the OFDM symbol in this embodiment of the present disclosure, and two adjacent OFDM symbols may also modulate the access information or the other information by means of differential phase modulation in a frequency domain. This is not limited in this embodiment of the present disclosure.

The correlation sequence symbol may be preset in the central office device, and which correlation sequence is used to form the correlation sequence symbol is not limited in this embodiment of the present disclosure.

Modulating the access information by means of differential phase modulation in a frequency domain using the OFDM symbol and the correlation sequence symbol includes modulating the access information using a phase difference of each subcarrier of the OFDM symbol and the correlation sequence symbol, and a specific modulation method is not limited in this embodiment of the present disclosure.

The correlation sequence symbol may carry a cyclic prefix and/or a cyclic suffix, and the OFDM symbol may also carry a cyclic prefix and/or a cyclic suffix. This is not limited in this embodiment of the present disclosure.

Step 503: The central office device receives the upstream access signal sent by the terminal device from the starting position of the upstream registration window, performs upstream ranging according to the correlation sequence symbol and the starting position that is of the upstream registration window and is indicated by the central office device using the upstream registration window information in order to obtain an upstream ranging result, and demodulates the correlation sequence symbol and the OFDM symbol in order to obtain the access information.

The central office device performing upstream ranging according to the starting position of the upstream registration window and the correlation sequence symbol to obtain an upstream ranging result may include calculating, according to the correlation sequence symbol, a starting position at which the central office device receives the upstream access signal, and calculating a distance between the starting position at which the central office device receives the upstream access signal and the starting position of the upstream registration window indicated by the central office device using the upstream registration window information, and setting the distance as the upstream ranging result.

For a specific implementation method for calculating, according to the correlation sequence symbol, the starting position at which the central office device receives the upstream access signal, reference may be made to a description in step 302, and details are not described herein.

Step 504: The central office device sends the upstream ranging result and response message of the access information to the terminal device.

Step 505: The terminal device receives the upstream ranging result and the response information of the access information, and adjusts a data sending time according to the upstream ranging result when determining that the access information belongs to access information of the terminal device.

Afterwards, data exchange at a data link layer or a network layer may be performed between the central office device and the terminal device.

In this embodiment, an upstream access signal includes a correlation sequence symbol and one OFDM symbol. A central office device may perform upstream ranging according to the correlation sequence symbol, and demodulates the correlation sequence symbol and the OFDM symbol to obtain access information, thereby completing upstream ranging and upstream registration.

Embodiment 4

Figure 6:
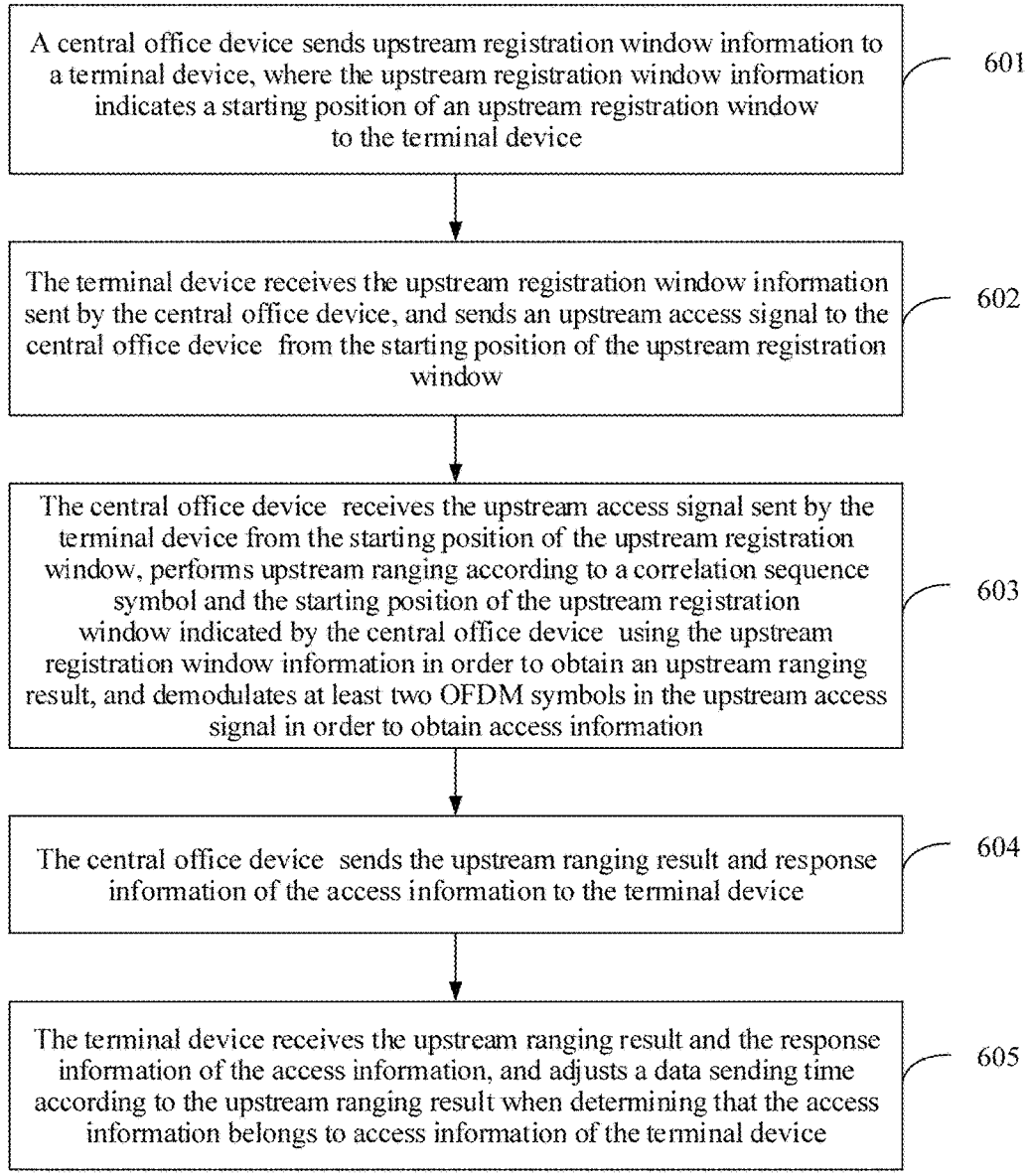
FIG. 6 is a schematic flowchart diagram of another embodiment of a terminal device registration method according to the present disclosure.

Referring to FIG. 6, FIG. 6 is a flowchart of another embodiment of a terminal device registration method according to the present disclosure. This embodiment describes a process in which a central office device and a terminal device implement upstream registration and ranging by means of interworking, and the method includes the following steps.

Step 601 to step 602 are the same as step 501 to step 502, and an only difference lies in that an upstream access signal in step 602 includes a correlation sequence symbol and at least two OFDM symbols following the correlation sequence symbol, where the correlation sequence symbol is constituted by a first sequence that meets a preset condition, and the preset condition includes a peak-to-average ratio of a second sequence obtained after a correlation operation of the first sequence with the first sequence itself is greater than a preset first value, and two adjacent OFDM symbols are modulated with access information by means of differential phase modulation in a frequency domain.

Generally, a data amount of the access information is relatively small. For example, the access information may include only an ID of the terminal device, then the upstream access signal may include only two OFDM symbols, and the two OFDM symbols may modulate all the access information by means of differential phase modulation in a frequency domain. However, if the data amount of the access information is relatively large in actual application, and only two OFDM symbols cannot modulate all the access information, the upstream access signal may include three or even more OFDM symbols, and two adjacent OFDM symbols are modulated with the access information by means of differential phase modulation in a frequency domain.

In actual application, in addition to modulating the access information by means of differential phase modulation in a frequency domain, the two adjacent OFDM symbols may further modulate other information that the terminal device expects to send to the central office device.

The correlation sequence symbol may be preset in the central office device, and which correlation sequence is used to form the correlation sequence symbol is not limited in this embodiment of the present disclosure.

Modulating the access information by means of differential phase modulation in a frequency domain using the OFDM symbol and the correlation sequence symbol includes modulating the access information using a phase difference of each subcarrier of the OFDM symbol and the correlation sequence symbol, and a specific modulation method is not limited in this embodiment of the present disclosure.

The correlation sequence symbol may carry a cyclic prefix and/or a cyclic suffix, and the OFDM symbol may also carry a cyclic prefix and/or a cyclic suffix. This is not limited in this embodiment of the present disclosure.

Before sending the upstream access signal to the central office device in this step, the terminal device needs to first generate the upstream access signal. Further, generating the upstream access signal may include determining the correlation sequence symbol, determining the at least two OFDM symbols following the correlation sequence symbol, where two adjacent OFDM symbols are modulated with the access information by means of differential phase modulation in a frequency domain, and generating the upstream access signal according to the determined correlation sequence symbol and the OFDM symbols.

Step 603: The central office device receives the upstream access signal sent by the terminal device from a starting position of an upstream registration window, performs upstream ranging according to the correlation sequence symbol and the starting position of the upstream registration window indicated by the central office device using upstream registration window information in order to obtain an upstream ranging result, and demodulates the at least two OFDM symbols in the upstream access signal in order to obtain the access information.

For a specific implementation method for calculating, according to the correlation sequence symbol, the starting position at which the central office device receives the upstream access signal, reference may be made to a description in step 302, and details are not described herein.

Step 604 to step 605 are the same as step 504 to step 505, and details are not described herein again.

In this embodiment, an upstream access signal includes a correlation sequence symbol and at least two OFDM symbols. A central office device may perform upstream ranging according to the correlation sequence symbol, and demodulates the OFDM symbols to obtain access information, thereby completing upstream ranging and upstream registration.

Embodiment 5

Corresponding to the embodiments of the terminal device registration methods of the present disclosure, the present disclosure further provides embodiments of a central office device and a terminal device for terminal device registration.

Figure 7:
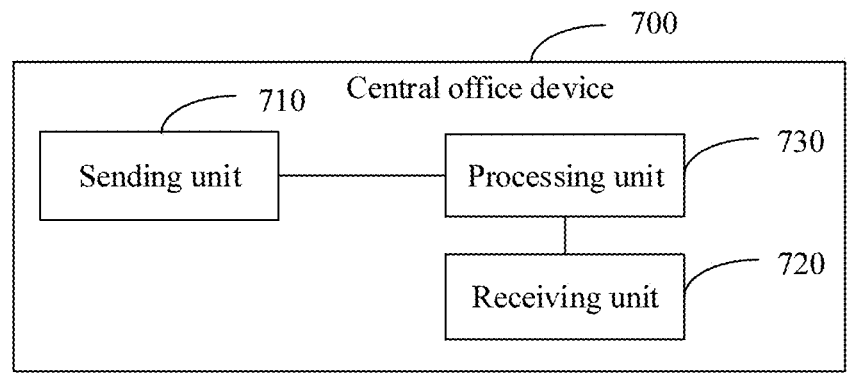
FIG. 7 is a schematic structural diagram of an embodiment of a central office device according to the present disclosure.

Referring to FIG. 7, FIG. 7 is a block diagram of an embodiment of a central office device according to the present disclosure. The central office device 700 includes a sending unit 710, a receiving unit 720, and a processing unit 730.

The sending unit 710 is configured to send upstream registration window information to a terminal device, where the upstream registration window information indicates a starting position of an upstream registration window to the terminal device.

The receiving unit 720 is configured to receive an upstream access signal sent by the terminal device from the starting position of the upstream registration window, where the upstream access signal includes a correlation sequence symbol and at least one OFDM symbol following the correlation sequence symbol, where the correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain.

The processing unit 730 is configured to perform upstream ranging according to the correlation sequence symbol received by the receiving unit 720 and the starting position of the upstream registration window indicated by the sending unit 710 using the upstream registration window information in order to obtain an upstream ranging result, and determine the access information according to the at least one OFDM symbol received by the receiving unit 720.

The sending unit 710 is further configured to send the upstream ranging result obtained by the processing unit 730 and response information of the access information to the terminal device.

Optionally, there is one OFDM symbol, and the OFDM symbol and the correlation sequence symbol are modulated with the access information by means of differential phase modulation in a frequency domain. The processing unit 730 is further configured to demodulate the correlation sequence symbol and the OFDM symbol in order to obtain the access information.

Optionally, there are at least two OFDM symbols, and two adjacent OFDM symbols are modulated with the access information by means of differential phase modulation in a frequency domain. The processing unit 730 may be further configured to demodulate the at least two OFDM symbols in order to obtain the access information.

Optionally, the processing unit 730 may be further configured to calculate, according to the correlation sequence symbol, a starting position at which the receiving unit 720 receives the upstream access signal, and calculate a distance between the starting position at which the receiving unit 720 receives the upstream access signal and the starting position of the upstream registration window indicated by the sending unit 710 using the upstream registration window information, and set the distance as the upstream ranging result.

Optionally, the correlation sequence symbol carries a cyclic prefix and/or a cyclic suffix.

Optionally, each OFDM symbol in the at least one OFDM symbol carries a cyclic prefix and/or a cyclic suffix, or the at least one OFDM symbol carries a cyclic prefix and/or a cyclic suffix.

For a specific implementation method for calculating, according to the correlation sequence symbol, the starting position at which the central office device receives the upstream access signal, reference may be made to a description in step 302, and details are not described herein.

In this embodiment, a central office device 700 receives an upstream access signal sent by a terminal device from a starting position of an upstream registration window, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain. Therefore, the central office device 700 can perform upstream ranging according to the correlation sequence symbol and the starting position of the upstream registration window indicated by the central office device 700 using upstream registration window information in order to obtain an upstream ranging result, and determine the access information according to the at least one OFDM symbol, thereby implementing upstream registration and upstream ranging.

Embodiment 6

Figure 8:
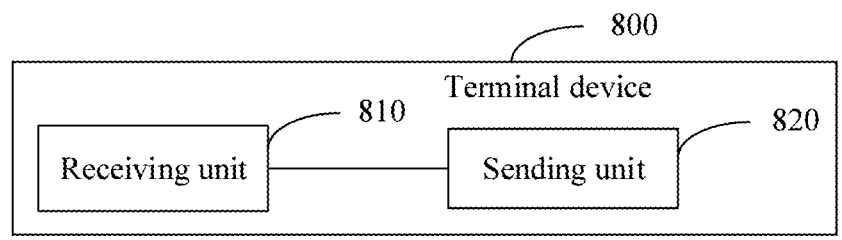
FIG. 8 is a schematic structural diagram of an embodiment of a terminal device according to the present disclosure.

Referring to FIG. 8, FIG. 8 is a block diagram of an embodiment of a terminal device according to the present disclosure. The terminal device 800 includes a receiving unit 810, and a sending unit 820.

The receiving unit 810 is configured to receive upstream registration window information sent by a central office device, where the upstream registration window information indicates a starting position of an upstream registration window.

The sending unit 820 is configured to send an upstream access signal to the central office device from the starting position of the upstream registration window indicated using the upstream registration window information received by the receiving unit 810, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain.

The receiving unit 810 is further configured to receive an upstream ranging result and response information of the access information sent by the central office device, where the upstream ranging result is obtained by performing upstream ranging by the central office device according to the correlation sequence symbol and the starting position of the upstream registration window indicated by the central office device using the upstream registration window information, and the access information is determined by the central office device according to the at least one OFDM symbol.

Optionally, the correlation sequence symbol carries a cyclic prefix and/or a cyclic suffix.

Optionally, each OFDM symbol in the at least one OFDM symbol carries a cyclic prefix and/or a cyclic suffix, or the at least one OFDM symbol carries a cyclic prefix and/or a cyclic suffix.

For a specific implementation method for calculating, according to the correlation sequence symbol, the starting position at which the central office device receives the upstream access signal, reference may be made to a description in step 302, and details are not described herein.

In this embodiment, a terminal device 800 receives upstream registration window information sent by a central office device, and sends an upstream access signal to the central office device from a starting position of the upstream registration window. Therefore, the central office device can perform upstream ranging and determining of access information according to the upstream access signal, and complete upstream ranging and registration together with the terminal device 800.

Embodiment 7

Figure 9:
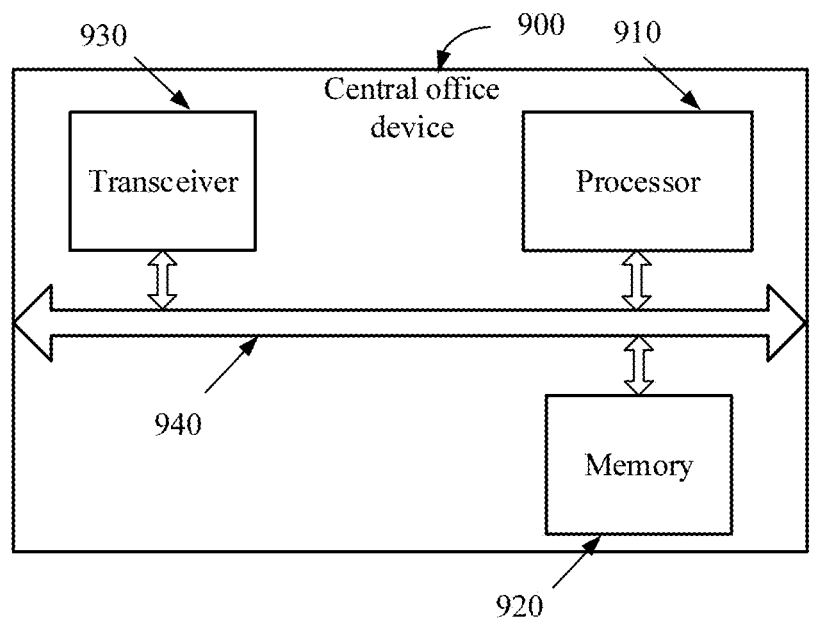
FIG. 9 is a schematic structural diagram of another embodiment of a central office device according to the present disclosure.

Referring to FIG. 9, FIG. 9 is a schematic structural diagram of a central office device according to an embodiment of the present disclosure. The central office device 900 includes a processor 910, a memory 920, a transceiver 930, and a bus 940.

The processor 910, the memory 920, and the transceiver 930 are connected to each other using the bus 940, and the bus 940 may be an industry standard architecture (ISA) bus, a peripheral component interconnect (PCI) bus, an extended ISA (EISA) bus, or the like. The bus may be classified into an address bus, a data bus, a control bus, and the like. For ease of denotation, the bus is represented only using one thick line in FIG. 9. However, it does not indicate that there is only one bus or only one type of bus.

The memory 920 is configured to store a program. Further, the program may include program code, and the program code includes a computer operation instruction. The memory 920 may include a high-speed random access memory (RAM), or may include a non-volatile memory, such as at least one disk memory.

The transceiver 930 is configured to connect to another device and communicate with the other device. The transceiver 930 is configured to send upstream registration window information to a terminal device, where the upstream registration window information indicates a starting position of an upstream registration window to the terminal device, receive an upstream access signal sent by the terminal device from the starting position of the upstream registration window, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, and send an upstream ranging result and response information of the access information to the terminal device.

The processor 910 executes the program code to perform upstream ranging according to the correlation sequence symbol and the starting position of the upstream registration window indicated using the upstream registration window information in order to obtain the upstream ranging result, and determine the access information according to the at least one OFDM symbol.

Optionally, there is one OFDM symbol, and the OFDM symbol and the correlation sequence symbol are modulated with the access information by means of differential phase modulation in a frequency domain. The processor 910 may be further configured to demodulate the correlation sequence symbol and the OFDM symbol in order to obtain the access information.

Optionally, there are at least two OFDM symbols, and two adjacent OFDM symbols are modulated with the access information by means of differential phase modulation in a frequency domain. The processor 910 may be further configured to demodulate the at least two OFDM symbols in order to obtain the access information.

Optionally, the processor 910 may be further configured to calculate, according to the correlation sequence symbol, a starting position at which the upstream access signal is received, and calculate a distance between the starting position at which the upstream access signal is received and the starting position of the upstream registration window indicated using the upstream registration window information, and set the distance as the upstream ranging result.

Optionally, the correlation sequence symbol carries a cyclic prefix and/or a cyclic suffix.

Optionally, each OFDM symbol in the at least one OFDM symbol carries a cyclic prefix and/or a cyclic suffix, or the at least one OFDM symbol carries a cyclic prefix and/or a cyclic suffix.

For a specific implementation method for calculating, according to the correlation sequence symbol, the starting position at which the central office device 900 receives the upstream access signal, reference may be made to a description in step 302, and details are not described herein.

In this embodiment, a central office device 900 receives an upstream access signal sent by a terminal device from a starting position of an upstream registration window, where the upstream access signal includes a correlation sequence symbol and at least one OFDM symbol following the correlation sequence symbol. The correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain. Therefore, the central office device 900 can perform upstream ranging according to the correlation sequence symbol and the starting position of the upstream registration window indicated by the central office device 900 using upstream registration window information in order to obtain an upstream ranging result, and determine the access information according to the at least one OFDM symbol, thereby implementing upstream registration and upstream ranging.

Embodiment 8

Figure 10:
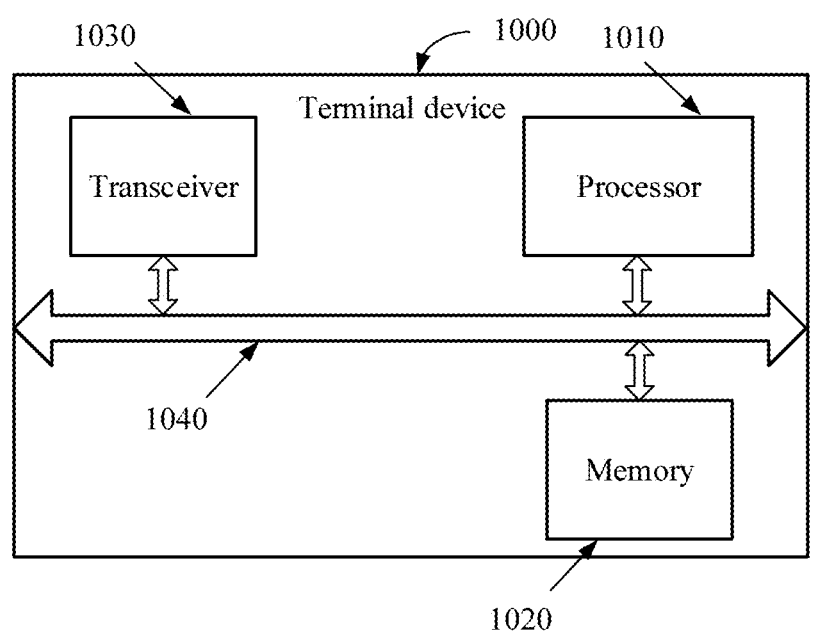
FIG. 10 is a schematic structural diagram of another embodiment of a terminal device according to the present disclosure.

Referring to FIG. 10, FIG. 10 is a schematic structural diagram of a terminal device according to an embodiment of the present disclosure. The terminal device 1000 includes a processor 1010, a memory 1020, a transceiver 1030, and a bus 1040.

The processor 1010, the memory 1020, and the transceiver 1030 are connected to each other using the bus 1040, and the bus 1040 may be an ISA bus, a PCI bus, an EISA bus, or the like. The bus may be classified into an address bus, a data bus, a control bus, and the like. For ease of denotation, the bus is represented only using one thick line in FIG. 10. However, it does not indicate that there is only one bus or only one type of bus.

The memory 1020 is configured to store a program. Further, the program may include program code, and the program code includes a computer operation instruction. The memory 1020 may include a high-speed RAM, or may include a non-volatile memory, such as at least one disk memory.

The transceiver 1030 is configured to connect to another device and communicate with the other device. The transceiver 1030 is configured to receive upstream registration window information sent by a central office device, where the upstream registration window information indicates a starting position of an upstream registration window, send an upstream access signal to the central office device from the starting position of the upstream registration window, where the upstream access signal includes a correlation sequence symbol and at least one OFDM symbol following the correlation sequence symbol, the correlation sequence symbol is constituted by a first sequence that meets a preset condition, and the preset condition includes a peak-to-average ratio of a second sequence obtained after a correlation operation of the first sequence with the first sequence itself is greater than a preset first value, and the at least one OFDM symbol modulates access information by means of differential phase modulation in a frequency domain, and receive an upstream ranging result and response information of the access information sent by the central office device, where the upstream ranging result is obtained by performing upstream ranging by the central office device according to the correlation sequence symbol and the starting position of the upstream registration window indicated using the upstream registration window information, and the access information is determined by the central office device according to the at least one OFDM symbol.

The processor 1010 executes the application program.

Optionally, the correlation sequence symbol carries a cyclic prefix and/or a cyclic suffix.

Optionally, each OFDM symbol in the at least one OFDM symbol carries a cyclic prefix and/or a cyclic suffix, or the at least one OFDM symbol carries a cyclic prefix and/or a cyclic suffix.

In this embodiment, a terminal device 1000 receives upstream registration window information sent by a central office device, and sends an upstream access signal to the central office device from a starting position of the upstream registration window. Therefore, the central office device can perform upstream ranging and determining of access information according to the upstream access signal, and complete upstream ranging and registration together with the terminal device 1000.

Persons skilled in the art may clearly understand that, the technologies in the embodiments of the present disclosure may be implemented by software in addition to a necessary general hardware platform. Based on such an understanding, the technical solutions in the embodiments of the present disclosure essentially, or the part contributing to the prior art may be implemented in a form of a software product. The software product is stored in a storage medium, such as a read-only memory (ROM)/RAM, a magnetic disk, or an optical disc, and includes several instructions for instructing a computer device (which may be a personal computer, a server, a network device, or the like) to perform the methods described in the embodiments or some parts of the embodiments of the present disclosure.

Embodiment 9

This embodiment of the present disclosure further provides an optical network system. As shown in FIG. 1, the optical network system includes a central office device and a terminal device, where the central office device and the terminal device are connected to each other using an ODN. The central office device may be the central office device described in Embodiment 5, the terminal device may be the terminal device described in Embodiment 6, and an interworking procedure between the central office device and the terminal device may be the method described in Embodiment 1 or Embodiment 2.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly. For related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. An upstream registration method, comprising:
sending, by a central office device, upstream registration window information to a terminal device;
receiving, by the central office device, an upstream access signal from the terminal device, the upstream access signal comprising a correlation sequence symbol and at least one orthogonal frequency division multiplexing (OFDM) symbol following the correlation sequence symbol, the correlation sequence symbol comprising a first sequence that meets a preset condition, the preset condition comprising a peak-to-average ratio of a second sequence obtained after a correlation operation of the first sequence with the first sequence itself is greater than a preset first value, and the at least one OFDM symbol modulating access information by differential Chase modulation in a frequency domain;
performing, by the central office device, upstream ranging according to the correlation sequence symbol and a starting position of an upstream registration window, the upstream registration window being indicated by the central office device using the upstream registration window information in order to obtain an upstream ranging result;
determining, by the central office device, the access information according to the at least one OFDM symbol, the OFDM symbol and the correlation sequence symbol being modulated with the access information by the differential phase modulation in the frequency domain when there is one OFDM symbol, and determining the access information comprises demodulating, by the central office device, the correlation sequence symbol and the OFDM symbol in order to obtain the access information; and
sending, by the central office device, the upstream ranging result and a response message of the access information to the terminal device.

2. An upstream registration method, comprising:
sending, by a central office device, upstream registration window information to a terminal device;
receiving, by the central office device, an upstream access signal from the terminal device, the upstream access signal comprising a correlation sequence symbol and at least one orthogonal frequency division multiplexing (OFDM) symbol following the correlation sequence symbol, the correlation sequence symbol comprising a first sequence that meets a preset condition, the preset condition comprising a peak-to-average ratio of a second sequence obtained after a correlation operation of the first sequence with the first sequence itself is greater than a preset first value, and the at least one OFDM symbol modulating access information by differential phase modulation in a frequency domain;

performing, by the central office device, upstream ranging according to the correlation sequence symbol and a starting position of an upstream registration window, the upstream registration window being indicated by the central office device using the upstream registration window information in order to obtain an upstream ranging result;

determining, by the central office device, the access information according to the at least one OFDM symbol, two adjacent OFDM symbols being modulated with the access information by the differential phase modulation in the frequency domain where there are at least two OFDM symbols, and determining the access information comprises demodulating, by the central office device, the at least two OFDM symbols in order to obtain the access information; and sending, by the central office device, the upstream ranging result and a response message of the access information to the terminal device.

3. An upstream registration method, comprising:

sending, by a central office device, upstream registration window information to a terminal device;

receiving, by the central office device, an upstream access signal from the terminal device, the upstream access signal comprising a correlation sequence symbol and at least one orthogonal frequency division multiplexing (OFDM) symbol following the correlation sequence symbol, the correlation sequence symbol comprising a first sequence that meets a preset condition, the preset condition comprising a peak-to-average ratio of a second sequence obtained after a correlation operation of the first sequence with the first sequence itself is greater than a preset first value, and the at least one OFDM symbol modulating access information by differential phase modulation in a frequency domain;

performing, by the central office device, upstream ranging according to the correlation sequence symbol and a starting position of an upstream registration window, the upstream registration window being indicated by the central office device using the upstream registration window information in order to obtain an upstream ranging result, performing the upstream ranging comprises:

calculating, by the central office device according to the correlation sequence symbol, a starting position at which the central office device receives the upstream access signal;

calculating, by the central office device, a distance between the starting position at which the central office device receives the upstream access signal and the starting position of the upstream registration window indicated by the central office device using the upstream registration window information; and setting the distance as the upstream ranging result, determining, by the central office device, the access information according to the at least one OFDM symbol; and sending, by the central office device, the upstream ranging result and a response message of the access information to the terminal device.

4. The method of claim 3, wherein the correlation sequence symbol comprises a cyclic prefix and a cyclic suffix.

5. The method of claim 3, wherein the correlation sequence symbol comprises a cyclic prefix.

6. The method of claim 3, wherein the correlation sequence symbol comprises a cyclic suffix.

7. The method of claim 3, wherein each OFDM symbol in the at least one OFDM symbol comprises a cyclic prefix and a cyclic suffix.

8. The method of claim 3, wherein each OFDM symbol in the at least one OFDM symbol comprises a cyclic prefix.

9. The method of claim 3, wherein each OFDM symbol in the at least one OFDM symbol comprises a cyclic suffix.

10. The method of claim 3, wherein the at least one OFDM symbol comprises a cyclic prefix and a cyclic suffix.

11. The method of claim 3, wherein the at least one OFDM symbol comprises a cyclic prefix or a cyclic suffix.

12. A central office device, comprising:

a memory comprising instructions;

a transmitter configured to send upstream registration window information to a terminal device, the upstream registration window information indicating a starting position of an upstream registration window to the terminal device;

a receiver coupled to the transmitter, the receiver configured to receive an upstream access signal from the terminal device from the starting position of the upstream registration window, the upstream access signal comprising a correlation sequence symbol and at least one orthogonal frequency division multiplexing (OFDM) symbol following the correlation sequence symbol, the correlation sequence symbol comprising a first sequence that meets a preset condition, the Preset condition comprising a peak-to-average ratio of a second sequence obtained after a correlation operation of the first sequence with the first sequence itself is greater than a preset first value, and the at least one OFDM symbol modulating access information by differential phase modulation in a frequency domain; and a processor coupled to the memory, the transmitter, and the receiver, the instructions causing the processor to be configured to:

perform upstream ranging according to the correlation sequence symbol received by the receiver and the starting position of the upstream registration window, the starting position of the upstream registration window indicated by the transmitter using the upstream registration window information in order to obtain an upstream ranging result; and determine the access information according to the at least one OFDM symbol received by the receiver, the OFDM symbol and the correlation sequence symbol being modulated with the access information by the differential phase modulation in the frequency domain where there is one OFDM symbol, and the instructions further cause the processor to be configured to demodulate the correlation sequence symbol and the OFDM symbol in order to obtain the access information, and the transmitter being further configured to send the upstream ranging result obtained by the processor and response information of the access information to the terminal device.

13. A central office device, comprising:

a memory comprising instructions;

a transmitter configured to send upstream registration window information to a terminal device, the upstream registration window information indicating a starting position of an upstream registration window to the terminal device;

a receiver coupled to the transmitter, the receiver configured to receive an upstream access signal from the terminal device from the starting position of the upstream registration window, the upstream access signal comprising a correlation sequence symbol and at least one orthogonal frequency division multiplexing (OFDM) symbol following the correlation sequence symbol, the correlation sequence symbol comprising a first sequence that meets a preset condition, the preset condition comprising a peak-to-average ratio of a second sequence obtained after a correlation operation of the first sequence with the first sequence itself is greater than a preset first value, and the at least one OFDM symbol modulating access information by differential phase modulation in a frequency domain; and a processor coupled to the memory, the transmitter, and the receiver, the instructions causing the processor to be configured to:

perform upstream ranging according to the correlation sequence symbol received by the receiver and the starting position of the upstream registration window, the starting position of the upstream registration window indicated by the transmitter using the upstream registration window information in order to obtain an upstream ranging result; and determine the access information according to the at least one OFDM symbol received by the receiver, two adjacent OFDM symbols being modulated with the access information by the differential phase modulation in the frequency domain when there are at least two OFDM symbols, and the instructions further cause the processor to be configured to demodulate the at least two OFDM symbols in order to obtain the access information, and the transmitter being further configured to send the upstream ranging result obtained by the processor and response information of the access information to the terminal device.

14. A central office device, comprising:

a memory comprising instructions;

a transmitter configured to send upstream registration window information to a terminal device, the upstream registration window information indicating a starting position of an upstream registration window to the terminal device;

a receiver coupled to the transmitter, the receiver configured to receive an upstream access signal from the terminal device from the starting position of the upstream registration window, the upstream access signal comprising a correlation sequence symbol and at least one orthogonal frequency division multiplexing (OFDM) symbol following the correlation sequence symbol, the correlation sequence symbol comprising a first sequence that meets a preset condition, the preset condition comprising a peak-to-average ratio of a second sequence obtained after a correlation operation of the first sequence with the first sequence itself is greater than a preset first value, and the at least one OFDM symbol modulating access information by differential phase modulation in a frequency domain; and a processor coupled to the memory, the transmitter, and the receiver, the instructions causing the processor to be configured to:

perform upstream ranging according to the correlation sequence symbol received by the receiver and the starting position of the upstream registration window, the starting position of the upstream registration window indicated by the transmitter using the upstream registration window information in order to obtain an upstream ranging result, the instructions further causing the processor to be configured to:

calculate, according to the correlation sequence symbol, a starting position at which the receiver receives the upstream access signal;

calculate a distance between the starting position at which the receiver receives the upstream access signal and the starting position of the upstream registration window indicated by the transmitter using the upstream registration window information; and set the distance as the upstream ranging result; and determine the access information according to the at least one OFDM symbol received by the receiver, and the transmitter being further configured to send the upstream ranging result obtained by the processor and response information of the access information to the terminal device.

* * * * *

UNITED STATES PATENT AND TRADEMARK OFFICE
CERTIFICATE OF CORRECTION

PATENT NO. : 10,153,839 B2
APPLICATION NO. : 15/581809
DATED : December 11, 2018
INVENTOR(S) : Xiaofeng Zhang and Guikai Peng Page 1 of 1

It is certified that error appears in the above-identified patent and that said Letters Patent is hereby corrected as shown below:

In the Claims

Column 22, Line 35: "Chase" should read "phase"

Column 24, Line 31: "Preset" should read "preset"

Signed and Sealed this
Nineteenth Day of February, 2019

Andrei Iancu
*Director of the United States Patent and Trademark Office*